United States Patent
Martin et al.

(10) Patent No.: US 7,397,371 B2
(45) Date of Patent: Jul. 8, 2008

(54) SECURITY SYSTEM ACCESS CONTROL AND METHOD

(75) Inventors: Christopher D. Martin, Plainview, NY (US); Thomas S. Babich, Glen Cove, NY (US); Kevin G. Piel, Ronkokoma, NY (US)

(73) Assignee: Honeywell International Inc., Morristown, NJ (US)

( * ) Notice: Subject to any disclaimer, the term of this patent is extended or adjusted under 35 U.S.C. 154(b) by 234 days.

(21) Appl. No.: 11/048,450

(22) Filed: Jan. 31, 2005

(65) Prior Publication Data

US 2006/0181402 A1 Aug. 17, 2006

(51) Int. Cl.
G08B 13/00 (2006.01)

(52) U.S. Cl. .................. 340/541; 340/506; 340/527; 340/528

(58) Field of Classification Search ............... 340/541, 340/506, 527, 528, 529, 5.1, 5.2
See application file for complete search history.

(56) References Cited

U.S. PATENT DOCUMENTS 5,400,246 A * 3/1995 Wilson et al. .............. 700/17

* cited by examiner

*Primary Examiner*—Daryl C Pope
(74) *Attorney, Agent, or Firm*—Dalia S. Grimberg; John Beninati; Robert S. Smith

(57) ABSTRACT

A security system which includes at least a first sensor, an alarm panel including a control system and programmable apparatus, a connection between the at least one sensor and set alarm panel, a keypad assembly including a camera, and a connection between the keypad assembly and the alarm panel. In various embodiments of the invention the camera includes a CMOS image sensor, the camera produces digital images, the camera tracks the user of the keypad assembly, the camera is remotely controllable from the alarm panel to focus on an object of interest, and/or the camera is remotely controllable from a central monitoring station to focus on an object of interest. In some cases the camera system is configured to take a picture in response to a specific user code entered by the user, take a picture in response to time of day when the input occurs, take a picture in response to invalid code entry and/or take a picture in response to an invalid card being presented. The invention also includes the method for providing enhanced security for protected premises which includes providing at least a first sensor, providing an alarm panel including a control system and programmable apparatus, providing a connection between the at least one sensor and the alarm panel, providing an input device including a camera, and initiating operation of the camera from the alarm panel.

19 Claims, 2 Drawing Sheets

SECURITY SYSTEM ACCESS CONTROL AND METHOD

BACKGROUND OF THE INVENTION

The present invention relates to the field of security systems for homes and businesses and particularly to methods and apparatus for security systems, including but not limited to access control for monitoring the identity of individuals using and/or providing inputs to the security system. Increasing theft and violence demand improved security systems to prevent crime, vandalism and terrorism. Modern security systems can detect perimeter violations and entry intrusions. As used herein, the term security system includes both systems to detect perimeter violations and entry intrusions as well as access control systems. Each of these system are intended to improve the security of protected premises, thus the use of the term "security system" to include access control is appropriate.

Keypad input devices for security systems often include both a plurality of keys and a reader for reading a magnetic code on a card. As used herein the term "keypad/reader" includes both a keypad and a card reader of conventional construction. Similarly, the term "keypad/reader system" refers to apparatus that is an aspect of one embodiment of the present invention and includes a keypad/reader and additional apparatus. Keypad/readers are typically coupled to security systems by hardwiring or wireless structure. Originally, keypad systems were primarily mounted outside the door of protected premises. The keypad has often controlled an electric strike or magnetic lock. Keypad/card reader devices are also used as input devices for security systems. The electronics on some models are mounted inside, in a secure place. They are particularly well-suited for people who find it difficult to insert and turn a key in a regular lock. Often such systems will turn off and sound an alarm after a preset number of wrong inputs. In some cases, the systems will recycle on again after a few minutes. Most of these systems are weather-proof and very rugged, although the keypads may not be weather-proof. Some such systems include a temporary code for a baby-sitter or house-keeper that can be changed as soon as the requirement for the temporary code ends. Such keypad systems permit the end user to provide a unique code for each person using the system. Accordingly, the security system, at least in some systems can maintain a record of the unique codes corresponding to the particular individuals that have been assigned the unique codes. Security systems that control an electric lock or strike the relay can be set so the lock or strike is timed to open or close for a pre-determined period. This is referred to as a momentary closure of the relay. Most keypads can also be set for latching, which means that when the correct code is entered, the relay will fire (open or close) and will remain in the same mode until the appropriate code is entered. In some cases a master code may be used to erase existing codes and add new codes. The installer may install more than one keypad system in each may be set up to control a single lock. Thus, one keypad system may be on the outside of the building and one keypad may be on the inside of the building in a manner that is analogous to a conventional double cylinder lock. In a typical security system, the keypad is separate from the alarm panel and thus the overall system is more secure.

In typical systems monitored conditions include: (1) Alarm—Indicates an intrusion at the protected premises, (2) Access—Indicates that an authorized person has turned the security system off, (3) Tamper—Indicates an attempt to disable the security system. Usually, a valid keypad code will correct an accidental alarm.

Special security measures are often required in national defense areas. For example, an organization may restrict the personnel who enter a specific area and require that the specific area always be supervised. Access control systems can provide this functionality through area and personnel configurations. An employee with the proper clearances would present his/her badge to an access control reader. Existing access control systems may determine that the person seeking access requires prior approval from an individual having a "supervisor" badge. Only upon successful presentation of the appropriate badge would access be granted, ensuring classified areas are properly protected.

This functionality enables security personnel not only to restrict access to appropriate staff, but also to generate reports and, subsequently, an audit of who entered the room, when they entered and exited the room and who was present to supervise. Another example of critical area security arises when elements in certain areas need to be protected from elements in other areas. For instance, several laboratories in the U.S. have been investigating ways to enforce strict rules requiring technicians to decontaminate before passing from one active lab to another.

They have found the capability for this requirement exists within the access control system. When assigning access privileges to personnel, records can be configured to require when a person has used a badge to access one lab, he/she is denied access to any other lab within the area until a pre-determined amount of time has passed, i.e. long enough for the substances he/she may be working with to become inert.

This "area lockout" functionality provides a layer of protection for employees and for the public in general. It can be as visible as desired. For instance, an alarm might sound when a violation occurs or, alternatively, a simple notation might be made on the security monitoring station for discrete action.

Many government organizations are required by health and safety regulations to be aware of occupancy levels in their facilities, because of evacuation concerns. To create an effective evacuation plan, security personnel need to know how many people are in certain areas within a building. Imposing occupancy restrictions, as configured in the security system, provides this level of control.

For example, a room can be configured to allow only five people to occupy it at one time. If a sixth person tries to gain access, a message will be displayed on the access control reader, indicating the room has reached its maximum occupancy level. Only when one person has presented his/her badge to exit the room will another be granted access.

Occupancy restrictions satisfy other health and safety concerns, as well. For instance, if maintenance is being performed in certain areas of a government facility, a two-man or multi-person rule may need to be enforced, to ensure potentially hazardous operations can be monitored. The type of personnel—such as supervisors or specialists—accounted for in the multi-person rule can also be controlled and monitored. While evacuation and occupancy concerns represent the extreme end of security plans, there are other equally important duress situations that can also be addressed by today's security systems.

An access card reader is an important part of the security infrastructure—and often the only visible component, which makes it an ideal medium to handle situations of duress. In parking garages, stairwells and other potentially vulnerable areas, card readers can provide a link to assistance when a person is presented with a hostile situation. When a duress command (typically *9 or 999) is entered on the reader keypad, an alarm can sound, a security phone can be dialed or other configurable events can be set in motion. The card reader can be used to arm or disarm entire sections or zones of a facility in the event of an emergency. Authorized personnel simply enter a specific code on the keypad. Doors can lock or unlock, cell phones can be called, etc.

The card reader can even be used to monitor the progress of a pre-configured guard tour. Many secured facilities rely on guards to make the rounds at pre-determined times. For every point on the tour, the guard must present his/her badge or enter a keypad number. Readers can be used as tour stops and will notify the system operator if the guard is late or misses a stop.

The prior art includes security systems that have system keypads or access control system readers/keypads (herein sometimes referred to as system keypads). In some cases a complete closed-circuit television system or equivalent is used to monitor the area in which the system keypads or access control system readers are disposed. Such closed-circuit television systems often require personnel to monitor displays. Such apparatus in the manpower required to utilize such systems is suitable for some applications, however for other applications such apparatus is unnecessarily expensive and complex.

SUMMARY OF THE INVENTION

It is an object of the present invention to provide a security system having innovative control possibilities that have not been suggested by the prior art.

A further object of the present invention is to provide a security system providing a very high level of security that does not require personnel to monitor displays produced by cameras continuously monitoring respective areas.

Another object of the invention is an inexpensive system and method that will maintain digital images of the person using the system keypad particularly at pre-and selected occasions.

Still another object of the invention is to provide a main control panel that has the ability to control how and when a picture is taken.

It has now been found that these and other objects of the invention may be obtained in a security system which includes at least a first sensor, an alarm panel including a control system and programmable apparatus, a connection between the at least one sensor and set alarm panel, a keypad assembly including a camera, and a connection between the keypad assembly and the alarm panel.

In various embodiments of the invention the camera includes a CMOS (or other means) image sensor, the camera produces digital images, the camera tracks the user of the keypad assembly, the camera is remotely controllable from the alarm panel to focus on an object of interest, and/or the camera is remotely controllable from a central monitoring station to focus on an object of interest. In some cases the camera system is configured to take a picture in response to a specific user code entered by the user, take a picture in response to time of day when the input occurs, take a picture in response to invalid code entry and/or take a picture in response to an invalid card being presented.

Some security system embodiments of the invention include a programmable apparatus, an input device assembly including a camera; and a connection between the input device assembly, the camera and the programmable apparatus. In some embodiments of the security system the camera includes a CMOS (or other means) image sensor. The camera may produce digital images and may track the user of the keypad assembly. The camera may be remotely controllable from the alarm panel to focus on an object of interest or may be remotely controllable from an associated central monitoring station to focus on an object of interest. The camera may be configured to take a picture in response to a specific user code entered by the user, take a picture in response to time of day when input occurs, take a picture in response to invalid code entry and/or take a picture in response to an invalid card being presented.

The invention also includes the method for providing enhanced security for protected premises which includes providing at least a first sensor, providing an alarm panel including a control system and programmable apparatus, providing a connection between the at least one sensor and the alarm panel, providing input device including a camera, and initiating operation of the camera from the alarm panel.

In various embodiments of the method in accordance with the present invention the step of providing a camera includes providing a CMOS image sensor, providing a camera that produces digital images, providing a camera that tracks the user of the keypad assembly, providing a camera that is remotely controllable from the alarm panel to focus on an object of interest, and/or providing a camera that is remotely controllable from a central monitoring station to focus on an object of interest.

Some embodiments of the method for providing enhanced security for protected premises may include the step of providing a camera that includes providing a camera that takes a picture in response to a specific user code entered by the user, that takes picture in response to time of day when input occurs, that takes picture in response to invalid code entry, and/or takes a picture in response to an invalid card being presented.

Other embodiments of the method for providing enhanced security for protected premises include providing programmable apparatus, providing an input device assembly including a camera, and providing a connection between the keypad assembly and the programmable apparatus.

In some forms of this method the step of providing an input device includes providing an input device that includes a camera that includes a CMOS image sensor, a camera that produces digital images, a camera that tracks the user of the input device, a camera that is remotely controllable from the programmable apparatus to focus on an object of interest or a camera that is remotely controllable from an associated central monitoring station to focus on an object of interest, a camera that takes a picture in response to a specific user code entered by the user, and/or a camera that takes a picture in response to the time of day when input occurs.

In some embodiments the method includes providing an input device that includes a camera that takes a picture in response to invalid code entry or an invalid card being presented. Other embodiments will take a picture upon the occurrence of an alarm, a valid card swipe, entry of a valid code and/or in accordance with a schedule established by the user. Some embodiments will take such a picture when the system is armed, disarmed or both when the system is armed and disarmed, In other embodiments a picture will be taken when motion is detected either when the system is armed, when the system is disarmed or both when the system is armed and disarmed. Some embodiments will take pictures at predetermined times such as at predetermined time intervals or at predetermined times as measured by a clock, e.g. at 2:10 AM and 3:40 AM.

Other forms of the invention include a unitary assembly of a camera and either a keypad, a card reader or input device.

BRIEF DESCRIPTION OF THE DRAWING

The invention will be better understood by reference to the accompanying drawing in which.

DESCRIPTION OF THE PREFERRED EMBODIMENTS

Figure 1:
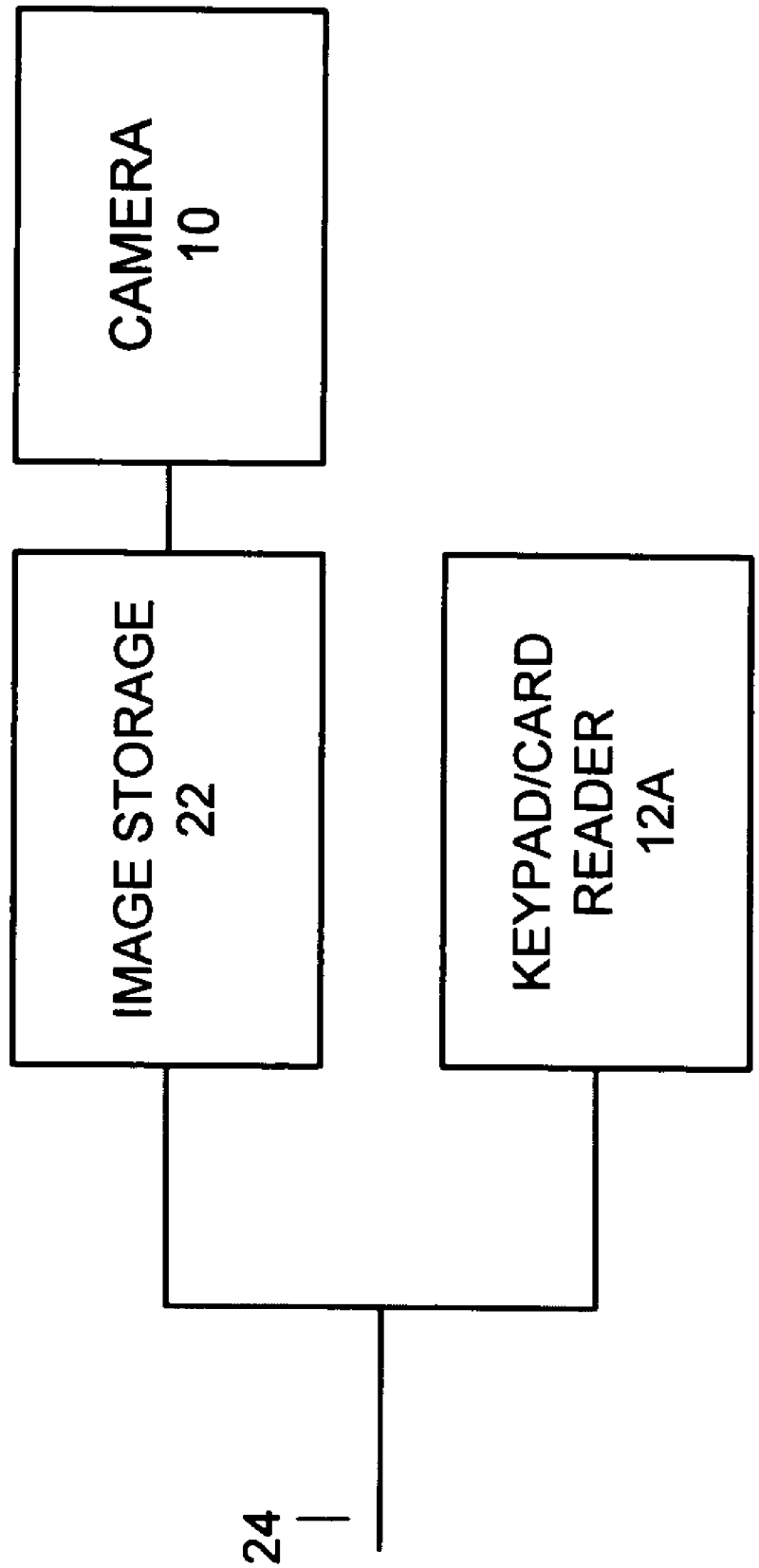
FIG. 1 is a block diagram of the keypad/card reader system portion of the apparatus in accordance with one form of the present invention.

The prior art includes a variety of security systems intended for homeowners, business owners, and other potential targets for burglary, that are monitored by a central station. Ideally a security and surveillance system should provide for the protection of the entire perimeter of a protected premises as well as visual- and audio-based surveillance monitoring. Security system sensors are available that are designed to detect sound, window and door intrusion, air movement, body heat, motion, and other conditions that indicate an intruder is present. A good security system design should consider the best plan for existing homes and businesses as well as new construction. It should also consider the lifestyle of all the inhabitants, the location of valuables or any items to be protected, how the system is to be controlled, adequate smoke and fire alerting sensors, and the type of emergency response required.

These systems are vastly superior to older systems that merely sound a bell or alarm. They have also largely replaced systems that were tied in directly to the local police station. As the use of burglar alarms increased, the local police departments began turning down more and more requests to be "hooked-up." As a result, there became a demand for central stations, or companies whose specialty it was to simply monitor burglar alarms. Most police departments will still allow banks and large jewelry stores a direct link to the police station, but as a rule, homeowners are excluded. So as the demand for security has risen, many guard agencies and burglar alarm installers have begun to offer centralized monitoring as an option for their clients.

When such systems are installed, it is common for them to be connected by a dedicated telephone line to the central station. Other systems utilize radio frequency and the internet to connect to the central station. In the event of an intrusion, the control panel (also known as a security panel) on the premises being monitored calls up the central station and gives an electronic message to the answering computer. It tells the computer exactly which switch or sensor has been violated, and the computer then tells the operator what has happened. For example if a burglar entered through a broken window, the panel would connect with the central station computer and tell it that zone 4, a first floor window, has been broken. The operator would then see on his computer screen that Acct. #1234, the Johnson residence has had zone 4, the window foiling on the living room window, violated. As the thief progresses through the house, the panel would call the central station for every sensor that was violated. The operator may then receive 1234-17, meaning that zone 17, a passive Infra-Red detector in the master bedroom, has detected someone. In some cases pre-amplified microphones allow audio monitoring of the protected premises. The operator would then be fairly sure someone was in the house, so the operator would have three options. The operator may just send the companies guards to the scene, call 911 and dispatch the police, or he may send both the police and the guards. In some embodiments the system may call people on a call list such as neighbors and relatives.

Passive infrared alarms are so called because they do not emit Infrared energy, but merely detect a change in Infrared energy. A PIR sensor probes its monitoring area, and if any changes are detected in Infrared (heat), it triggers an alarm. A PIR records the ambient room temperature so it will notice any changes in IR such as those that are produced by the human body. Slow temperature changes, such as thermostatically controlled heating systems, will not interfere with the PIR's function.

Figure 2:
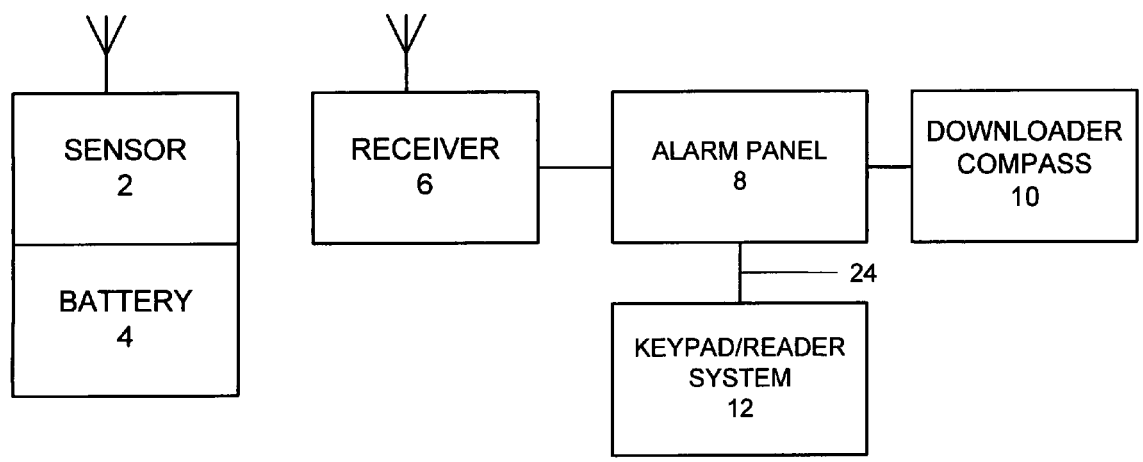
FIG. 2 is a schematic block diagram of a wireless security system incorporating the present invention.

Referring now to FIG. 2, there is shown a security system that includes a conventional sensor, such as a passive infrared (PIR) sensor 2. Commercially available devices of this type are manufactured and sold by Honeywell and identified by the designation Ademco 5890 or 5894. Customarily the wireless sensor 2 is constructed and programmed to issue a signal at a predetermined interval to confirm the presence and operability of the sensor 2. For example, such a signal may be sent at an interval of once every hour to confirm to an alarm panel that the sensor has not been stolen or become inoperative.

The signal from the sensor 2 is transmitted to a receiver 6 that is configured to receive the signal from the sensor 2. Commercially available devices of this type are manufactured by Honeywell and are identified by the designation Ademco 5881.

The receiver 6 is physically connected to an alarm panel 8. A commercially available alarm panel 8 for such an application is manufactured by Honeywell and identified by the designation VISTA 50.

In a preferred embodiment of the present invention a keypad/reader system 12 cooperates with the alarm panel 8 and is an input device for providing control inputs to the alarm panel 8. FIG. 1 illustrates diagrammatically the entire keypad reader system 12. It will be seen from FIG. 1 that the keypad/reader system 12 includes a conventional keypad/card reader 12A. A typical prior art wireless keyboard is manufactured by Honeywell and identified as the Ademco 5828V wireless talking keypad that offers quick and easy installation. Homeowners can use the built-in family message center to record and play back voice messages. The specifics of one form of the keyboard in accordance with the present invention are described below.

Typically, the alarm panel 8 is coupled by a phone line to a microcomputer running control software whereby the alarm panel 8 may be remotely controlled. One commercially available software program for such purposes is marketed by Honeywell and identified as the Ademco Compass Downloader 10. This software permits a user to remotely program and control an alarm system. The user may do so from the comfort of an office and will allow the user to download and upload alarm control information, to compare the upload and saved information, and to view the results either on a screen or any printed report. The Compass Downloader enables programming from an office prior to installation. Alternatively, initial programming can be downloaded from a remote location or at a job site using a personal computer with a commercially available serial module such as the Honeywell/Ademco 4100SM (where the alarm panel supports it).

The Ademco Compass Downloader for Windows Software 10 is network compatible software that provides a quick and easy method for planning, designing and communicating with the alarm panels. With this software the user can upload system programming that has been manually entered into the panel, or previously downloaded. The Compass change feature reviews all system changes initiated by the download operator within the current session. A complete record of system modifications and the history of an account are also available.

Such security systems include a control or alarm panel 8 that includes a microprocessor and cooperating memory coupled by an appropriate data bus. The present invention may be implemented by providing software to achieve the objects of the present invention. While it is the preferred embodiment of the present invention to implement the objects thereof with software, those skilled in the art will recognize that the various logical steps could also be achieved with hardware. The construction of such hardware, upon of exposure to the teachings of the present application, will be obvious to those skilled in the art.

Such existing systems utilize keypads for security system input control functions. Many different types of keypads are known, including wired, wireless, LCD, Voice Response with Message Center, and wireless receiver. Some existing keypads have a video camera installed which requires a video monitor and recorder that may continuously monitor a specific location. The present invention captures digital images only upon the occurrence of selected events.

Providing the capability to record a digital photograph of a person using the system keypad (unauthorized or otherwise), would in the conventional apparatus require a separate system to do so. In most cases this would be prohibitively expensive.

The apparatus in accordance with a preferred form of the invention allows a security system keypad or access control system keypad to take a digital photograph of anyone using the keypad access pad. More particularly, preferred forms of the invention include a digital camera built into a security system keypad or access system reader for the purposes of taking a digital photograph when certain user/dealer programming conditions are met.

The system and method in accordance with the invention can take a digital picture at selected times as programmed into the system. For example, if the keypad/station is used at an unusual time, such as when the premises are not normally occupied, an invalid code is entered or an invalid card swipe occurs, or merely to confirm that a card is being used by the right person. In a preferred embodiment the images are stored in the keypad locally and downloaded to the main control panel via a communications bus.

Referring now to FIG. 1 there is shown a diagrammatic view of a preferred embodiment of the keypad/card reader system. This system, in a preferred embodiment of the present invention, includes a camera 20, and an image storage chip or chipset 22 and a keypad/card reader 12A. A communications bus 24 connects to the alarm panel 8 that is part of the rest of the security system, so that the apparatus in accordance with the present invention knows under what conditions to take a picture. The communications bus 24 is 2-way communications bus, such as, an RS485 bus in a preferred embodiment of the present invention. Other bus standards may also be utilized in other embodiments of the present invention. The links between the camera 10, image storage 22 and keypad/card reader 12A may also be an RS 485 bus although other embodiments may use other standards. The control or alarm panel 8 may then be used in any way such as a display via security system downloader or end user software or another keypad or station. Some embodiments of the invention may include a display such as a liquid crystal display. In some embodiments of the invention the images are displayed in real time at the alarm panel, other keypad system devices are a central-station that monitors the premises. In other cases the digital file of photographs will be stored for access as required at a later time. In some cases the photographs are displayed on a graphic keypad.

In a preferred embodiment of the invention the image storage chip set is made by OmniVision Technologies, Inc. of Sunnyvale, Calif. Such a chip set is sometimes referred to as a dual-mode camera reference design chip set intended for low-cost, high-performance dual-mode camera applications. This product is an integrated CMOS image sensor that is also used in electronic cameras used in mobile phones and other optical imaging devices. The latest dual-mode digital still camera reference design provides a chip set that has dual-mode functionality that enables the camera to operate as either an un-tethered digital still camera, with its own memory for picture storage, or tethered to a PC, where it operates as a PC video camera. The current state of the art chip set, featuring OmniVision's OV8610 SVGA-resolution (800×600) CMOS image sensor, is designed for users who want a higher resolution for both their still images and their computer display. The dual-mode solution has the performance of current CCD-based, dual-mode solutions but with a simpler design and a lower cost of materials. OmniVision additionally offers reference designs for both VGA (640× 480) and CIF (320×240) resolutions. Some embodiments of the present invention may include video and still image embodiments.

The OmniVision dual-mode camera reference design features eight megabytes of internal memory storage, enabling storage of up to 80 SVGA-resolution images with JPEG compression. The memory can be in SDRAM or NAND FLASH configuration. For FLASH memory configuration, the design supports Samsung and Toshiba NAND, such as K9F6408U0B-TCB0 or K9F6408U0B-TIB0. Additionally, the design features a strobe light and a high-quality, focus-free lens. The convenient liquid crystal (LCD) status display is located on the camera back and displays still/video shot, self timer, flash light 50/60 Hz setting and a picture counter for up to 999 shots. The un-tethered camera can take up to 400 QVGA-resolution JPEG shots for video applications. The camera has an auto-power-off feature that will minimize the power consumption when not in use. A buzzer is also used for shutter/timer/power signals. The dual-mode functionality of the camera enables it to perform PC-based video camera applications.

Advantages of the system and method in accordance of the present invention include:

1. The keypad will allow the security system to take digital photographs of users without the expense required for a complete closed-circuit television system. The integrated digital camera may be used at preprogrammed times. Such as when the system is used by a specific user or cardholder, at specific times of day or night, when an invalid code or card swipe occurs, to validate a user, to see who may be using a lost or stolen card, etc.
2. Stored images may be used by the security system. The keypads may include, in some embodiments, a display device for displaying the stored images. Some embodiments of the apparatus and method in accordance with invention may allow the display of digital photographs taken at a first keypad on another keypad connected to the security system. In some cases the digital photographs may be transmitted from the alarm panel to a central monitoring station.

The present invention includes a new keypad which includes an integrated digital camera much in the same way that a conventional cell phone may include this feature today. The system keypad may have on or more of the following features:

1. The camera may have local digital storage (memory) within the keypad or the digital image may be sent down to the main control board via a communications bus (e.g., ECP, RS485, or Ethernet). The number of images that may be stored are limited only by the size of the memory included in the keypad and main alarm panel 8. Some embodiments of the present invention may use removable flash memory media such as MMC cards.
2. The system keypad design may include methods and apparatus to aim the camera in desired directions where the best use of it can be obtained depending upon factors such as keypad height, range needed, etc. some embodiments may include a camera that will track a user in a manner that some webcams currently function. See, for example, the Logitech Auto-tracking WebCam. This particular motorized camera has a head combined with face tracking software that allows the camera lens to follow its subject—up and down, or left and right—as that person shifts in a chair or moves freely about the room. The webcam also features a 9-inch stand, so the camera can be at eye level, whether on a desk or resting on top of a monitor. The QuickCam Orbit webcam has a range of 128 degrees side-to-side (for an almost 180-degree horizontal view), and 54 degrees up-and-down (for an almost 90-degree vertical view); the camera can automatically follow a person, zooming in or out as the person moves about a room, or it can be manually controlled through the software.
3. The system keypad may include electronic and manual means to focus the camera and also include features for low light conditions and wide-angle lenses.

The presence of the camera in the keypad will allow the security system to do one or more of the following:

1. Allows the system to take and store digital photographs whenever preprogrammed conditions are met without the need for a complete video system such as closed-circuit television system.
2. The system may be programmed so that the camera takes a photograph at preprogrammed times by the installer or end user. Examples of instances in which it may be appropriate or desirable to take a digital photograph include but are not limited to:

When the system keypad is used by a specific user (determined by user code entered) or by an access control card swipe.

When the system keypad is used during specific times of the day or night or on weekends or holidays to determine who the user is.

When the system is used by an invalid user (invalid code entered or invalid card is presented at the reader)

When a specific legitimate user code is entered or a legitimate access card is presented at the keypad/reader. This photo may be used to later confirm who used the card or code. This is appropriate when the card or code has been stolen or lost. Accordingly, the photo may be viewed to determine who is using the lost or stolen card or code.

Stored images may be used to display at other connected or remote systems such as graphical keypads capable of displaying the images, end user software packages, or dealer software packages used to control the system. The stored images may even be sent from the alarm panel to a central station monitoring service.

Images may be sent via any of our AlarmNet services (marketed by Honeywell Security & Custom Electronics) including cellular, Internet, Intranet so that the images may be viewed by other authorized parties Photographs may be taken when motion is detected in the area of the keypads location. This would be controlled by the main system.

It will be understood that various embodiments of the present invention may include only a card reader input device, only a keypad input device or a combination of both a card reader input device and a keypad input device. In the preferred embodiment of the control of the camera relies on the alarm panel and the programmable apparatus therein. Other embodiments may include programmable apparatus and memory in the keypad or other input device in accordance with the present invention. The term "programmable apparatus" includes but is not limited to a microprocessor and memory as well as mechanical and electrical devices that accept inputs and provide control outputs. In some cases such devices may include logic gates. Still other embodiments may use mechanical logic systems.

It will be appreciated that the systems and methods of the present invention are described with reference to block diagram illustrations. It should be understood that blocks of the block diagrams illustrations, and combinations of blocks in the block diagrams illustrations, respectively, may be implemented by computer program instructions. These computer program instructions may be loaded onto a general purpose computer, special purpose computer, or other programmable data processing apparatus to produce a mechanism, such that the instructions which execute on the computer or other programmable data processing apparatus create means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means that implement the functions specified herein. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified herein.

Accordingly, blocks of the block diagrams illustration support combinations of means for performing the specified functions, combinations of steps for performing the specified functions and program instruction means for performing the specified functions. It will also be understood that each block of the block diagrams illustration, and combinations of blocks in the block diagrams illustrations, can be implemented by special purpose hardware-based computer systems that perform the specified functions or steps, or combinations of special purpose hardware and computer instructions.

The respective methods and systems in accordance with the present system may utilize a computer that includes a microprocessor and memory and which cooperates with software that is commercially available or within the skill of practitioners in the programming arts. The alarm panel 8 of many security systems includes this structure. While the present invention has been described in terms of a card reader or a keypad, those skilled in the art will recognize that the invention has application to any other input device. As used herein the term "input device" includes, but is not limited to card readers and keypads. (Just as computers may have a variety of input devices including but not limited to retinal sensors, fingerprint sensors, mice and microphones, security systems may also have a wide variety of input devices.) Similarly, the term "security system" as used herein includes, but is not limited to access control systems and other security systems intended to prevent crime, vandalism and terrorism. It will also be understood that the term "connection" includes but is not limited to physical connections as well as wireless connections.

Although the description above contains many specifics, these should not be construed as limiting the scope of the invention, but as merely providing illustrations of some of the presently preferred embodiments of this invention. Thus, the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A security system which comprises:
    at least a first sensor;
    an alarm panel including a control system including programmable apparatus;
    a connection between said at least one sensor and said control system;
    an input assembly including a camera; and
    a connection and control between said input assembly and said control system causing saving of images from said camera upon selected predetermined events at the input assembly.

2. A security system as described in claim 1 wherein said camera tracks the user of the input assembly.

3. A security system as described in claim 1 wherein said camera takes a picture in response to a specific user code entered by the user.

4. A security system as described in claim 1 wherein said camera takes picture in response to time of day when input occurs.

5. A security system as described in claim 1 wherein said camera takes picture in response to invalid code entry.

6. A security system as described in claim 1 wherein said camera takes picture in response to an invalid card being presented.

7. A method for providing enhanced security for protected premises which comprises:
    providing at least a first sensor;
    providing an alarm panel including a control system and programmable apparatus;
    providing a connection between the at least one sensor and the alarm panel;
    providing an input device including a camera; and
    initiating operation of the camera from the alarm panel in response to events at the input device.

8. A method for providing enhanced security for protected premises as described in claim 7 wherein the step of providing a camera includes providing a camera that tracks the user of the input device assembly with movement of the camera.

9. A method for providing enhanced security for protected premises as described in claim 7 wherein the step of providing a camera includes providing a camera that tracks the user of the input device assembly in response to activity at the input device.

10. A method for providing enhanced security for protected premises as described in claim 7 wherein the step of providing a camera includes providing a camera that is remotely controllable from the alarm panel to focus on an object of interest.

11. A method for providing enhanced security for protected premises as described in claim 7 wherein the step of providing a camera includes providing a camera that takes a picture in response to a specific user code entered by the user.

12. A method for providing enhanced security for protected premises as described in claim 7 wherein the step of providing a camera includes providing a camera that takes picture in response to time of day when input occurs.

13. A method for providing enhanced security for protected premises as described in claim 7 wherein the step of providing a camera includes providing a camera that takes picture in response to invalid code entry.

14. A method for providing enhanced security for protected premises as described in claim 7 wherein the step of providing a camera includes providing a camera that takes picture in response to an invalid card being presented.

15. A method for providing enhanced security for protected premises as described in claim 7 wherein the step of providing an input device including a camera includes providing a camera that takes at least one picture in response to a specific user code entered by the user.

16. A method for providing enhanced security for protected premises as described in claim 7 wherein the step of providing an input device including a camera includes providing a camera that takes at least one picture in response to the time of day when input occurs.

17. A method for providing enhanced security for protected premises as described in claim 7 wherein the step of providing an input device including a camera includes providing a camera that takes at least one picture in response to an event selected from the group consisting of an alarm, motion in a predefined location, the elapse of a predetermined time interval, a valid card swipe, and a valid input entry.

18. A method for providing enhanced security for protected premises which comprises:
    providing programmable aiwaratus;
    providing an input device assembly including a camera: and
    providing a connection between the input device and the programmable apparatus to control the camera in response to activity at the input device wherein the step of providing an input device includes providing an input device that includes a camera that tracks the user of the input device assembly.

19. A method for providing enhanced security for protected premises which comprises:
    providing programmable apparatus:

providing an input device assembly including a camera: and providing a connection between the input device and the programmable apparatus to control the camera in response to activity at the input device wherein the step of providing an input device includes providing an input device that includes a camera that takes a picture in response to invalid code entry.

* * * * *